March 25, 1952    F. D. DE VANEY    2,590,090
NODULIZING PROCESS AND APPARATUS
Filed Sept. 16, 1946
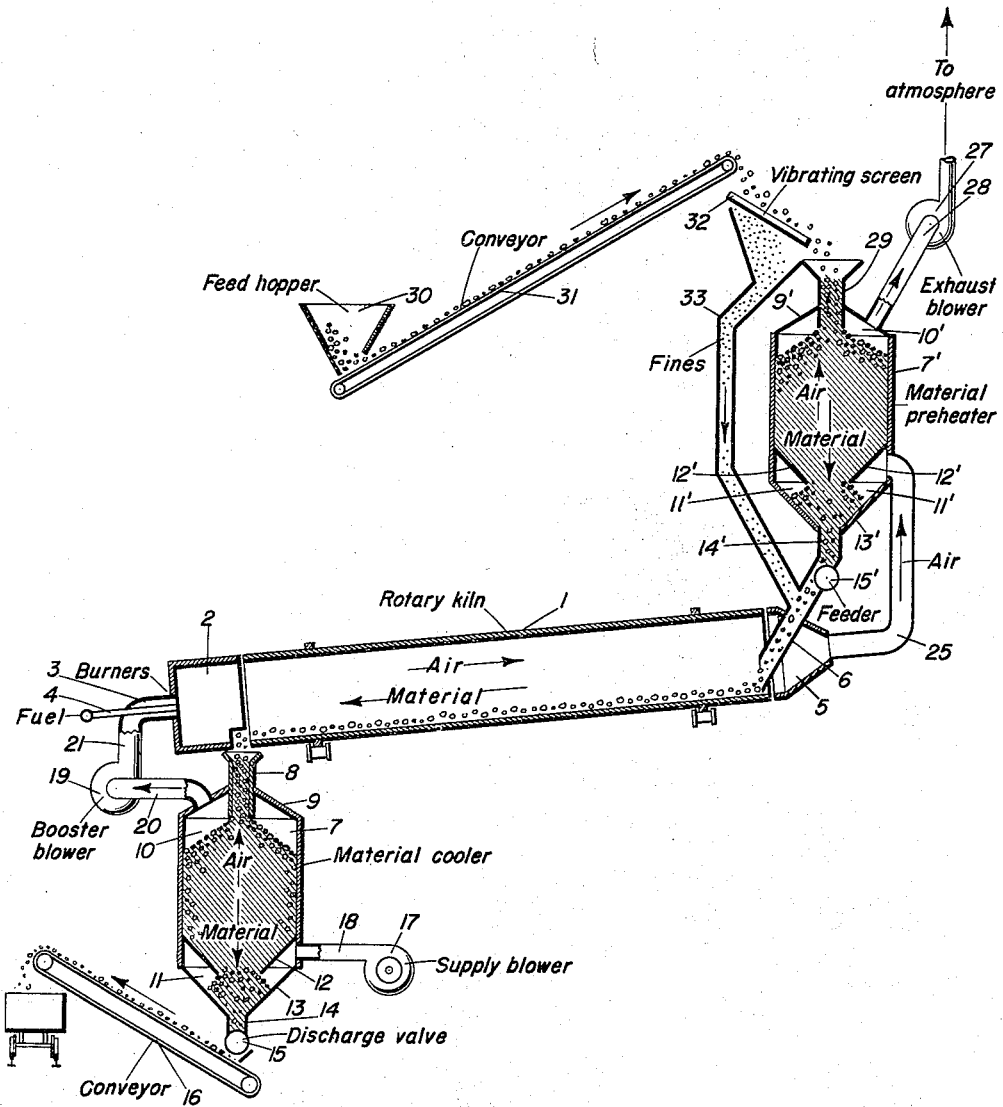
INVENTOR
Fred D. DeVaney
BY Pierce, Scheffler & Parker
his Attorneys.

Patented Mar. 25, 1952

2,590,090

UNITED STATES PATENT OFFICE 2,590,090

NODULIZING PROCESS AND APPARATUS

Fred D. De Vaney, Hibbing, Minn., assignor to Erie Mining Company, Hibbing, Minn., a corporation of Minnesota Application September 16, 1946, Serial No. 697,373

4 Claims. (Cl. 263—32)

1

This invention relates to the provision of means for recovering heat from the products and by-products (solid, and/or gaseous) discharged from rotary kilns. While the invention will, in the following, be described with particular reference to improved heat recovery in the nodulizing of finely divided ore materials in rotary nodulizing kilns, it is to be appreciated that the invention is applicable also to other operations conventionally carried out in rotary kilns, e. g., to kiln operations producing lime, cement clinker, and the like, to the drying and/or calcination of ores, etc.

I am aware that it heretofore has been proposed to recover heat from the solid product discharged hot from the rotary kiln by causing the hot solids to pass through a rotary tube in countercurrent to the incoming, initially "cool" combustion air. However, the notoriously poor efficiency of heat transfer by the rotating cooling tube method just noted makes it economically impossible to recover substantially all of the heat initially resident in the hot solids; besides, the proposal is open to the disadvantage that heavy moving parts are required, which are costly to install, maintain and operate. Also, it has been proposed to recover heat from the hot exit gases (from the rotary kiln) by causing said gases to give up some of their heat to the combustion air by indirect heat-transfer in a recuperator. While some small fraction of heat probably could be recovered in the manner proposed, the recovery, which is at best only partial, requires special machinery which is costly to install, maintain and operate.

According to the present invention the heat-treated solids discharged hot at the low or discharge end of the rotary kiln are caused to feed gravitationally into a chamber, onto a gravitationally moving, gas-traversable mass of like solids at least partially filling the chamber, while simultaneously the descending mass of solids is traversed by a current of initially relatively cool air (moving countercurrently with respect to the direction of movement of said mass) eventually constituting the combustion air fed to the fuel burner in the low end of the rotary kiln. The initially hot solid product loses heat to the initially relatively cool air with the results that (1) the air delivered to the burner as combustion air is preheated and (2) the initially hot solid product is discharged at a desirably low temperature. Similarly, the gases exiting hot from the high or feed end of the rotary kiln are caused to pass countercurrently through a gas-traversible, gravitationally descending mass of the "raw" initially substantially unheated solid material about to be fed into the kiln. In their passage through the mass of solids the initially hot gases lose heat to the solids and are exhausted to atmosphere at a temperature substantially lower than that at which they exited from the kiln, e. g. at a temperature not materially higher than the initial temperature of the feed, and simultaneously the feed is preliminarily heat-treated, e. g. dried (if initially containing free water), or/and preheated.

The invention will now be more specifically described, in its application to the nodulization of a coarse granular iron ore, reference being had to the accompanying drawing in which the single figure is a diagrammatic representation of an assemblage of apparatus elements operable for carrying out the present process.

In the drawing, 1 represents a conventional inclined rotary kiln which in known manner is supported on suitable bearings and is caused to rotate by suitable means not shown. The lower end of the kiln is closed by a stationary, substantially gas-tight discharge hood 2 in which are mounted burners including combustion air inlets 3 and fuel inlets 4. The upper end of the kiln likewise is closed by a stationary, substantially gas-tight feed hood 5 with which latter a feed inlet member 6 cooperates. The hoods and the burners being conventional require no further description.

Beneath the lower end of kiln 1 there is located a thermally insulated chamber or stove 7. 8 is a discharge conduit communicating in a substantially gas-tight manner with the lower end of kiln 1 and with the bottom of discharge hood 2 for delivery of hot solids from the kiln to chamber 7; conduit 8 preferably is extended downwardly through the roof 9 of chamber 7 for a suitable distance so that the upper free surface of a bed (labeled "Material" in the drawing) of the heat-treated solids fed into chamber 7 through conduit 8 in cooperation with the roof 9 and walls of chamber 7 define a gas-collecting space 10, of substantial extent, contiguous with the upper free surface of such a bed. An annular lower open space 11 is provided, immediately adjacent a lower free surface of such bed, by an annular inwardly extending baffle member 12 depending from the walls of chamber 7 and functioning to constrict the bed and thereupon allowing it to flow out against the generally conical bottom 13 of chamber 7. Bottom 13 terminates in a delivery conduit 14 closed at its lower end by a discharge valve, or "star gate" 15 of conventional design. Valve 15 functions to discharge cooled solids from chamber 7 to any suitable solids-disposing means such, for instance, as conveyor band 16 while preventing the discharge of any substantial volume of gas.

Lower open space 11 communicates with the pressure side of a supply blower 17 through conduit 18. Gas-collecting space 10 communicates with the suction side of booster blower 19 through conduit 20. 21 is a conduit communicating between the pressure side of booster blower 19 and combustion air inlets 3.

A second chamber 7', generally similar to 7, is positioned above the upper end of kiln 1. Conduit 25 communicates between feed hood 5 and the lower open space 11' in chamber 7'. Feed inlet member 6 is a lower extension of delivery conduit 14' below valve 15'. Gas-collecting space 10' communicates with the suction side of exhaust blower 27 through conduit 28. A feed conduit 29, similar in form and general function to conduit 8, is positioned in the roof 9' of chamber 7'.

The feed is elevated from feed hopper 30 to above the inlet of feed conduit 29 by an endless conveyor band 31. In the specific embodiment illustrated in the drawing, where the feed contains a substantial proportion of fines, the fines are separated from the more granular portion of the crude feed by passing the latter over a vibrating screen 32, intermediate conveyor 31 and inlet conduit 29, adapted to pass the fines but to retain and feed forward the granular portion. A hopper-topped fines conduit 33 is positioned beneath vibrating screen 32 for collecting the separated fines and for delivering the latter to feed inlet member 6.

In the carrying out of the process of the present invention in the above described apparatus the operation is as follows: The crude feed is a fines-containing, but essentially coarsely granular, high moisture iron ore having the following analysis on a dry basis:

| | Percent weight |
|---|---|
| Iron | 54.22 |
| Phos. | .078 |
| SiO$_2$ | 8.87 |
| Mn. | 1.11 |
| Alum. | 5.02 |
| Ign. loss | 4.46 |
| Moisture | 15.73 |

The screen analysis of this material as mined and brought to the nodulizing plant is as follows:

| | |
|---|---|
| Plus 1.05" | 17.72 |
| Plus .371" | 14.82 |
| Plus 6 mesh | 18.73 |
| Plus 35 mesh | 26.49 |
| Plus 65 mesh | 12.00 |
| Plus 100 mesh | 2.16 |
| Minus 100 mesh | 8.08 |
| Total | 100.00 |

The crude feed elevated by conveyor 31 from hopper 30 is delivered to screen 32, and by the latter is separated into a fines fraction, diverted by fines conduit 33, and a coarsely granular fraction delivered to inlet conduit 29 of chamber 7'. In this operation the crude feed is so screened as to divert to and through conduit 33 substantially all of the particles less than 3/8 inch in size, thus by-passing about two-thirds of the crude feed around preheat chamber 7'. Preferably, the rate of feed to chamber 7' is so adjusted, with respect to the rate of discharge through valve 15', that inlet conduit 29 and chamber 7' are maintained substantially continuously full (save for gas-collecting space 10' and for lower open space 11') of material. The rate of discharge of material from chamber 7' is controlled by valve 15'.

The fines are re-combined with the coarser solids, discharged through valve 15', in feed inlet member 6 and pass to kiln 1. The by-passing of the fines is resorted to where, as in the instant case, the inclusion of fines (dry or wet) in the bed maintained in chamber 7' would render the bed undesirably impervious to the current of initially hot gases intended to be passed therethrough.

Hot gaseous products of combustion exiting from kiln 1 are passed into lower open space 11' of chamber 7' through conduit 25 and thence upwardly through the bed of solids in said chamber; in their passage through the bed they are cooled—substantially to the boiling point of water—by heat transfer to said solids, and the latter simultaneously are heated to a temperature materially above the boiling point of water and hence are dried and preheated. Under the conditions above recited, the heat saving effected by this step is of the order of 250,000 B. t. u./ton of feed.

In the kiln 1 occurs the actual nodulization of the ore. A suitable fuel is commingled with, and burned in, the combustion air by means of the burners located in lower hood 2, and the resulting hot gaseous products of combustion pass countercurrently in contact with the solids slowly moving downwardly through kiln 1. The combustion gases are in such volume and at such temperature as to heat the solids to nodulizing temperature (e. g., in this case to a temperature of the order of 2200° F. to 2500° F.). By reason of the fact that at least a part of the feed going to the kiln has been dried and preheated, the amount of fuel, delivered at 4, necessary for heating the solids to nodulizing temperature is considerably, e. g., 10%, less than it otherwise would be.

Chamber 7 and conduit 8 are maintained substantially full—save for gas-collecting space 10 and lower open space 11—of the initially hot (e. g., about 2500° F.) nodulized product, valve 15 being so controlled as to maintain the desired depth of column in 7 and 8. Material continuously being discharged through 15 is diverted by conveyor 16 to a point of further disposal, e. g., to a railroad car, stockpile, or the like. As the material moves downwardly through chamber 7 it is contacted by a counter-current of initially substantially unheated air from lower open space 11, and is cooled thereby to a lower temperature, e. g., to a temperature of the order of 250° F. to 400° F. Simultaneously, the air passed through chamber 7 is correspondingly preheated and is delivered at the burners in preheated state, thereby still further reducing the amount of fuel necessary to be fed at 4 for heating the solids in kiln 1 to nodulizing temperature. The amount of heat so recovered (from the nodulized product) as useful preheat in the combustion air will, of course, vary but will be of the order of 500,000 B. t. u./ton of material nodulized.

It is to be understood that when the crude feed consists mostly of fines it may prove impracticable to pass the kiln gases through a bed of such fines. In such event, I contemplate dispensing with the material preheating step (and of course with the step of separately handling the fines), and feeding the solids to the kiln in conventional manner, the exit gases likewise being disposed of in a known manner.

While under the set of conditions of the above specific example it was expedient to exhaust preheated combustion air from gas-collecting space 10 to the kiln burners by the aid of booster blower 19, the invention includes (1) the possibility of shifting blower 19 to a position in conduit 25 whereby to expedite removal of kiln gases from kiln 1 to lower open space 11' of chamber 7'; or, (2) the possibility of positioning a second booster blower, similar in function to part 19, in conduit 25 in aid of booster blower 19 positioned as shown in the drawing. Chamber 7, or chamber 7', may be constructed as diagrammatically illustrated, or it or they may be given any other known form of the well-known "Royster stove." The number of blowers used and their positioning, the form of the "Royster stove" employed, the means for delivering crude feed, the means for diverting treated product from chamber 7, and the exact form of the hooded kiln itself, are matters of engineering expediency not characterizing or limiting the present invention.

I claim:

1. In rotary kiln apparatus including a rotary kiln provided with lower and upper stationary hoods, a fuel burner in the lower stationary hood and a solids-feeding means in the upper stationary hood, the provision of a stationary preheating chamber above the inlet end of the rotary kiln and communicating with the solids-feeding means, means for delivering initially substantially unheated solids to be treated into said preheating chamber, upon a bed of similar solids therein, valve means at the bottom of said preheating chamber for controlling gravitational movement of solids therefrom into said solids-feeding means whereby to maintain a bed of such solids in said preheating chamber, means adjacent the bottom of said preheating chamber for establishing and maintaining a lower open space therein adjacent a lower free surface of a bed of solids contained in said preheating chamber, a conduit communicating between the upper stationary hood of the rotary kiln and the lower open space of the preheating chamber for delivery of hot gases exiting from the upper end of the kiln to said lower open space, a stationary cooling chamber below the discharge end of the rotary kiln and communicating with the latter in substantially gas-tight manner, a conduit for gravitationally directing initially hot solid product discharged from the lower end of the rotary kiln into the upper end of said cooling chamber, valve means at the bottom of said cooling chamber for controlling gravitational discharge of solid product from the cooling chamber whereby to maintain in the latter a bed of such initially hot solid product, means for establishing and maintaining in said cooling chamber an upper gas-collecting space above and contiguous with an upper free surface of such bed of initially hot solid product maintained in said cooling chamber, a gas conduit communicating between said upper gas-collecting space and a fuel burner in the lower stationary hood of the rotary kiln, and means for forcing a current of combustion-supporting gas upwardly through such bed of initially hot solid product in said cooling chamber into and through said gas-collecting space, said gas conduit, the burner, the rotary kiln, the lower open space of the preheating chamber, and upwardly through a bed of initially substantially unheated solids contained in said preheating chamber.

2. In the operation of a fuel-fired rotary kiln in which variously sized solid particles fed thereto are heat-treated and a solid product discharged hot from the kiln is contacted with combustion air going to the kiln burner, the improvements which consist in dividing the total solid particles feed into a finer particles portion and a coarser particles portion, passing the finer particles portion directly to the kiln, establishing and maintaining a gas traversable gravitationally-moving bed of the coarser particles portion, forcing the gases exiting from the kiln countercurrently through said bed, feeding the so-treated coarser particles portion to the kiln, establishing and maintaining a gas-traversable gravitationally-moving bed of the initially hot solid product, and forcing combustion air in initially substantially unheated state countercurrently through the last-mentioned bed and to the kiln burner.

3. In a rotary kiln apparatus including a rotary kiln provided with lower and upper stationary hoods, a fuel burner in the lower stationary hood and a solids-feeding means in the upper stationary hood, the provision of a feed screening means, a conveyor in communication with said solids-feeding means and adapted to convey material passed by said screening means to said solids-feeding means, a stationary preheating chamber above the inlet end of the rotary kiln and communicating with the solids-feeding means, means for delivering solids not passed by said screening means into said preheating chamber, upon a bed of similar solids therein, valve means at the bottom of said preheating chamber for controlling gravitational movement of solids therefrom into said solids-feeding means whereby to maintain a bed of such solids in said preheating chamber, means adjacent the bottom of said preheating chamber for establishing and maintaining a lower open space therein adjacent a lower free surface of a bed of solids contained in said preheating chamber, a conduit communicating between the upper stationary hood of the rotary kiln and the lower open space of the preheating chamber, a stationary cooling chamber below the discharge end of the rotary kiln and communicating with the latter in substantially gas-tight manner, a conduit for gravitationally directing solid product discharged from the lower end of the rotary kiln into the upper end of said cooling chamber, valve means at the bottom of said chamber for controlling gravitational discharge of solid product from said chamber, means for establishing and maintaining in said cooling chamber a gas-collecting space above and contiguous with an upper free surface of a bed of solid product maintained in said cooling chamber, a gas conduit communicating between said gas-collecting space and a fuel burner in the lower stationary hood of the rotary kiln, and means for forcing a current of combustion-supporting gas upwardly through said cooling chamber into and through said gas-collecting space, said gas conduit, the burner, the rotary kiln, the lower open space of the preheating chamber, and upwardly through said preheating chamber.

4. In the operation of a fuel-fired rotary kiln in which solid particles fed thereto are heat-treated and a solid product is discharged hot from the kiln, the improvements which consist in establishing and maintaining a gas-traversable gravitationally-moving column of the solid particles to be treated, said column being characterized in that adjacent its lower end a free surface, of substantial area as compared with the cross-sectional area of the column, thereof is continguous to a gas space, feeding solid particles discharged from said column, after having passed said gas space, to the feed end of the rotary kiln, establishing and maintaining a gas-traversable gravitationally-moving column of the initially hot solid product immediately as discharged from the kiln, this latter column being characterized in that adjacent its lower end a free surface, of substantial area as compared with the cross-sectional area of the column, thereof is contiguous to a gas space, and forcing a current of air in initially substantially unheated state serially into the gas space contiguous to said last-mentioned column and through said last-mentioned column, the kiln burner, the kiln, into the gas space contiguous to said first-mentioned column and through said first-mentioned bed countercurrently to the movement of solids through said columns and kiln.

FRED D. DE VANEY.

REFERENCES CITED

The following references are of record in the file of this patent:

UNITED STATES PATENTS

| Number | Name | Date |
|---|---|---|
| Re. 19,757 | Royster | Nov. 12, 1935 |
| 1,605,279 | Pike | Nov. 2, 1926 |
| 1,828,270 | Anderson | Oct. 20, 1931 |
| 1,912,811 | Wechter | June 6, 1933 |
| 2,049,071 | McCormick | July 28, 1936 |
| 2,073,105 | Hoffman | Mar. 9, 1937 |
| 2,399,450 | Ramseyer | Apr. 30, 1946 |
| 2,417,949 | Riveroll | Mar. 25, 1947 |